(12) United States Patent
Ho et al.

(10) Patent No.: US 12,284,156 B2
(45) Date of Patent: Apr. 22, 2025

(54) SYSTEMS AND METHODS FOR DYNAMIC TRAFFIC CONTROL AT A FIREWALL

(71) Applicant: SHOPIFY INC., Ottawa (CA)

(72) Inventors: Dennis Ho, Ottawa (CA); Devon Meunier, Guelph (CA)

(73) Assignee: SHOPIFY INC., Ottawa (CA)

( * ) Notice: Subject to any disclaimer, the term of this patent is extended or adjusted under 35 U.S.C. 154(b) by 310 days.

(21) Appl. No.: 17/858,322

(22) Filed: Jul. 6, 2022

(65) Prior Publication Data

US 2024/0015137 A1    Jan. 11, 2024

(51) Int. Cl.
*G06F 21/00* (2013.01)
*H04L 9/40* (2022.01)

(52) U.S. Cl.
CPC ............... *H04L 63/0227* (2013.01)

(58) Field of Classification Search
CPC ............ H04L 63/0227; H04L 63/0263
See application file for complete search history.

(56) References Cited

U.S. PATENT DOCUMENTS

| | | | |
|---|---|---|---|
| 6,401,118 B1 | 6/2002 | Thomas | |
| 8,078,483 B1 | 12/2011 | Hirose et al. | |
| 10,063,519 B1* | 8/2018 | Zhao | H04L 63/0263 |
| 11,176,230 B2 | 11/2021 | Toth et al. | |
| 11,201,855 B1* | 12/2021 | Kondamuri | H04L 63/0263 |
| 11,297,035 B2 | 4/2022 | Francis et al. | |
| 2005/0273855 A1* | 12/2005 | Oberle | H04L 63/0263 726/22 |
| 2007/0174079 A1 | 7/2007 | Kraus | |
| 2008/0115190 A1* | 5/2008 | Aaron | H04L 63/0272 726/1 |
| 2008/0162298 A1 | 7/2008 | Aliabadi et al. | |
| 2010/0131386 A1 | 5/2010 | Shiely et al. | |
| 2010/0191692 A1 | 7/2010 | Gassewitz et al. | |
| 2010/0223471 A1 | 9/2010 | Fresko et al. | |
| 2010/0235218 A1 | 9/2010 | Erhart et al. | |
| 2013/0246146 A1 | 9/2013 | Fischer et al. | |

(Continued)

FOREIGN PATENT DOCUMENTS

CN    110490752 A    11/2019

OTHER PUBLICATIONS

Keiser, Barbie E. "To Be or Not to Be: Competitive Intelligence Tools". Online Searcher 43:4: 18-25. Information Today, Inc. (Jul./Aug. 2019). 6 pages.

(Continued)

*Primary Examiner* — Michael M Lee

(57) ABSTRACT

There may be situations in which it is desirable to dynamically implement a rule on the firewall in response to detecting a particular pattern of user activity. However, the software code required for tracking user activity, identifying patterns of user activity, and deciding what action to take may be relatively complex. Deploying such software code on a firewall increases the complexity of the firewall. For example, the firewall can no longer be "stateless". In some embodiments, the destination server works in combination with the firewall. The destination server monitors traffic to determine particular patterns of user activity. In response to a particular pattern of user activity being detected, an appropriate rule is established and the firewall is sent a command to implement the rule.

17 Claims, 8 Drawing Sheets

700

Receive incoming traffic originating from a plurality of user devices, the incoming traffic having passed through a firewall interposed between the server and the user devices
710

Detect a pattern of user activity based at least on the incoming traffic
720

Responsive to detecting the pattern, obtain a rule corresponding to the pattern of user activity
730

Transmit a command for the firewall to address, based on the rule, traffic matching the pattern of user activity prior to that traffic reaching the server
740

(56) References Cited

U.S. PATENT DOCUMENTS

| | | | |
|---|---|---|---|
| 2014/0101044 A1* | 4/2014 | Blackhurst | G06Q 20/4015 |
| | | | 705/44 |
| 2014/0282872 A1 | 9/2014 | Hansen et al. | |
| 2014/0358629 A1 | 12/2014 | Shivaswamy et al. | |
| 2014/0372250 A1 | 12/2014 | Dugan | |
| 2015/0106876 A1* | 4/2015 | Baldonado | H04L 63/0227 |
| | | | 726/1 |
| 2015/0324840 A1 | 11/2015 | Ramnath Krishnan | |
| 2015/0363858 A1 | 12/2015 | Kleinhandler et al. | |
| 2016/0210674 A1 | 7/2016 | Allen et al. | |
| 2018/0108036 A1 | 4/2018 | Laufenberg et al. | |
| 2018/0343174 A1 | 11/2018 | Battre et al. | |
| 2019/0130439 A1 | 5/2019 | Handrigan et al. | |
| 2019/0253385 A1* | 8/2019 | Gurney | H04L 63/0263 |
| 2020/0244752 A1 | 7/2020 | Trainor | |
| 2021/0241351 A1 | 8/2021 | Francis et al. | |
| 2021/0243160 A1 | 8/2021 | Francis et al. | |
| 2021/0400080 A1* | 12/2021 | Kaidi | G06N 5/025 |
| 2022/0191172 A1 | 6/2022 | Francis et al. | |
| 2022/0368672 A1* | 11/2022 | Velugu | H04L 63/0236 |

OTHER PUBLICATIONS

Non-Final Rejection issued on U.S. Appl. No. 16/782,561, dated Apr. 21, 2021, 23 pages.
Non-Final Rejection issued on U.S. Appl. No. 16/782,556, dated Jul. 27, 2021, 9 pages.

* cited by examiner

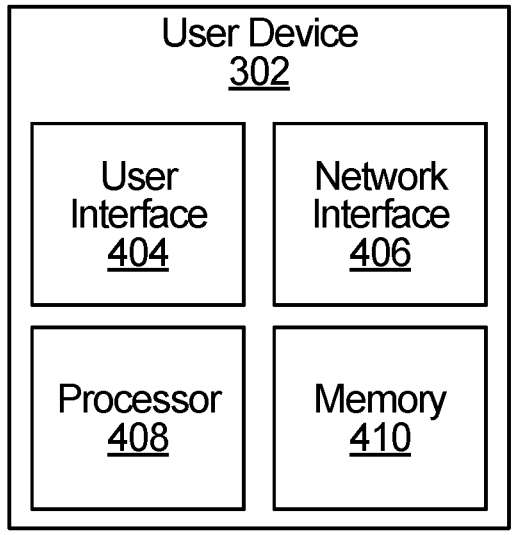
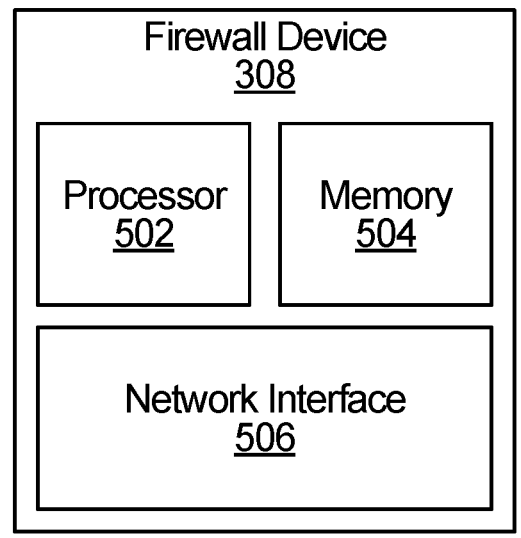
FIG. 2
FIG. 3
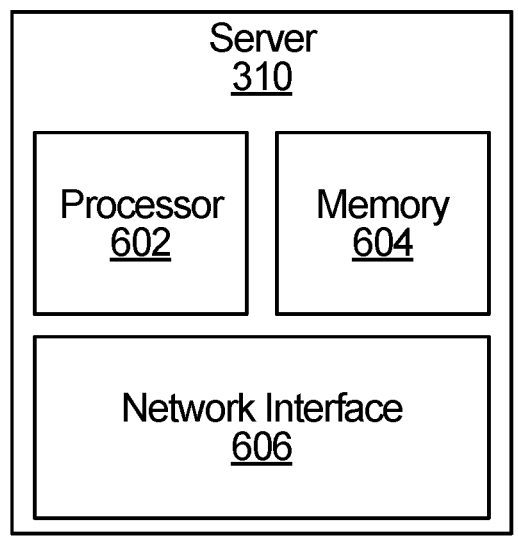
FIG. 4

FIG. 10

SYSTEMS AND METHODS FOR DYNAMIC TRAFFIC CONTROL AT A FIREWALL

FIELD

The following relates to computer networking, and, more particularly, to traffic control at a firewall.

BACKGROUND

A server may execute actions in response to traffic (e.g. requests) received from user devices over a network. For example, the server may receive a request from a user device, such as an Hypertext Transfer Protocol (HTTP) or Hypertext Transfer Protocol Secure (HTTPS) request. The request may be for a particular resource, e.g. the request may be for a particular web page hosted by the server or the request may be for the server to perform a particular function. Because the traffic from the user devices is destined for the server, the server will be referred to as a "destination server". A firewall, e.g. web application firewall (WAF), may be interposed between the destination server and the user devices. Traffic from a user device may be intercepted by the firewall before it is allowed to reach the destination server. The firewall may determine, for example, whether to permit or block the traffic.

SUMMARY

There may be situations in which it is desirable to dynamically implement a rule on the firewall in response to detecting a particular pattern of user activity. For example, if tracked user activity reveals the presence of repeated requests for a web page within a short window of time that originate from a same Internet Protocol (IP) address, then the firewall may in response dynamically implement a rule that blocks web page requests from that particular IP address for a particular duration of time. However, the software code required for tracking user activity, identifying patterns of user activity, and deciding what action to take may be relatively complex. Deploying such software code on a firewall increases the complexity of the firewall. For example, the firewall can no longer be "stateless". A stateless firewall does not need to maintain a record of previous user requests, rather it is designed to handle a user request entirely on information in the user request. Having a firewall instead tracking user activity, identifying patterns of user activity, and deciding what rules to implement in response requires more complex memory and computing resources to be deployed at the firewall and requires the firewall to no longer be stateless. Moreover, the firewall may include a large number of firewall devices distributed across many edge nodes, which would require deploying, updating, synchronizing, and/or maintaining many copies of the complex software code and configurations, each copy on a respective different firewall device.

One possibility is to not deploy a firewall separate from the destination server, but instead perform the firewall function at the destination server. However, the destination server is typically configured to handle backend heavy business logic that consumes significant computer resources. Therefore, it is not desirable to take computer resources of the destination server to implement a firewall. Moreover, it negates the computational efficiency associated with delegating implementation of the rule to a lower complexity device such as firewall. Moreover, implementing the firewall at the destination server negates the security benefits of having a firewall separate from the destination server.

Instead, in some embodiments there is provided a firewall that is separate from the destination server and that is interposed between the user devices and the destination server. The firewall itself does not monitor for patterns of user activity, nor does it dynamically determine to implement rules in response to detected patterns. The firewall may instead remain lower complexity, e.g. the firewall may be able to remain stateless, which may significantly reduce the complexity of the firewall. The destination server (or another computing device in the system, e.g. connected to the destination server at the backend) monitors traffic allowed by the firewall and received at the destination server. The monitoring is used to determine particular patterns of user activity. In response to a particular pattern of user activity being detected, an appropriate rule is established and the firewall is sent a command to implement the rule. The destination server relieves the firewall of the complexity of tracking user activity over time, detecting particular patterns of user activity, and in response deciding what rule to dynamically implement, which allows for reduced complexity for the firewall. Also, because the destination server is performing the pattern detection, this means that a pattern may possibly be detected in traffic distributed across multiple different firewall devices of the firewall. The firewall relieves the destination server of having to implement the firewall, which provides efficiency and security benefits for the destination server. In this way, the combination of the destination server and firewall working together may provide for dynamic implementation of rules in response to detected patterns of user activity, while doing so in a way that is beneficial in implementation for both the firewall and the destination server.

According to one embodiment, a computer-implemented method is provided. The method may include receiving, at a server, incoming traffic originating from a plurality of user devices. The incoming traffic may have passed through a firewall interposed between the server and the user devices. The method may further include detecting a pattern of user activity based at least on the incoming traffic. The method may further include, responsive to detecting the pattern, obtaining a rule corresponding to the pattern of user activity. The method may further include transmitting a command for the firewall to address, based on the rule, traffic matching the pattern of user activity prior to that traffic reaching the server.

In some embodiments, the pattern of user activity may be undesirable user activity. In some embodiments, the rule may mitigate the undesirable user activity. In some embodiments, the undesirable user activity may include repeated requests for a same resource from a same user. In some embodiments, the repeated requests for the same resource may be for a same web page or for a same function to be performed by the server. In some embodiments, the same user may be identified from at least one of: an IP address that is the same across the repeated requests; a browser ID that is the same across the repeated requests; or a user ID that is the same across the repeated requests.

In some embodiments, the command may automatically expire after a particular amount of time. The particular amount of time may be based on an e-commerce event. In some embodiments, the user activity may be associated with an e-commerce event. In some embodiments, an e-commerce event may include one of: a flash sale; a limited offering of a product; a product that is out of stock; a product that is recently re-stocked; a release of a product; a request for a web page relating to a product; or a request for the server to perform a function relating to a product.

In some embodiments, the rule, when implemented, may cause one of: blocking at least some of the traffic matching the pattern prior to that traffic reaching the server; imposing a delay before allowing the traffic matching the pattern to proceed to the server; or routing or rerouting the traffic matching the pattern to a different destination.

In some embodiments, the firewall may include a plurality of firewall devices. In some embodiments, the incoming traffic may be received from the plurality of firewall devices. In some embodiments, the pattern of user activity may be detected across the incoming traffic received from the plurality of the firewall devices.

In some embodiments, detecting the pattern of user activity in the incoming traffic may include counting how many requests for a same resource are received over a particular window of time, and identifying the pattern if the count exceeds a threshold.

A system is also disclosed that is configured to perform the methods disclosed herein. For example, the system may include a memory and at least one processor to directly perform (or instruct the system to perform) the method steps, e.g. when the at least one processor executes processor-executable instructions stored in the memory.

A computer-readable medium is also disclosed having stored thereon computer-executable instruction that, when executed, cause a computer to perform the methods disclosed herein. The computer-readable medium may be non-transitory.

BRIEF DESCRIPTION OF THE DRAWINGS

Embodiments will be described, by way of example only, with reference to the accompanying figures wherein:

FIG. 2 illustrates a user device, according to one embodiment;

FIG. 3 illustrates a firewall device, according to one embodiment;

FIG. 4 illustrates a server, according to one embodiment;

FIG. 10 illustrates a home page of an administrator, according to one embodiment.

DETAILED DESCRIPTION

For illustrative purposes, specific example embodiments will now be explained in greater detail below in conjunction with the figures. In some of the embodiments below, examples are presented in the context of e-commerce. However, the methods and systems disclosed herein are not limited to e-commerce and are instead applicable to any scenario in which it is desired to perform dynamic traffic control in a network.

Figure 1:
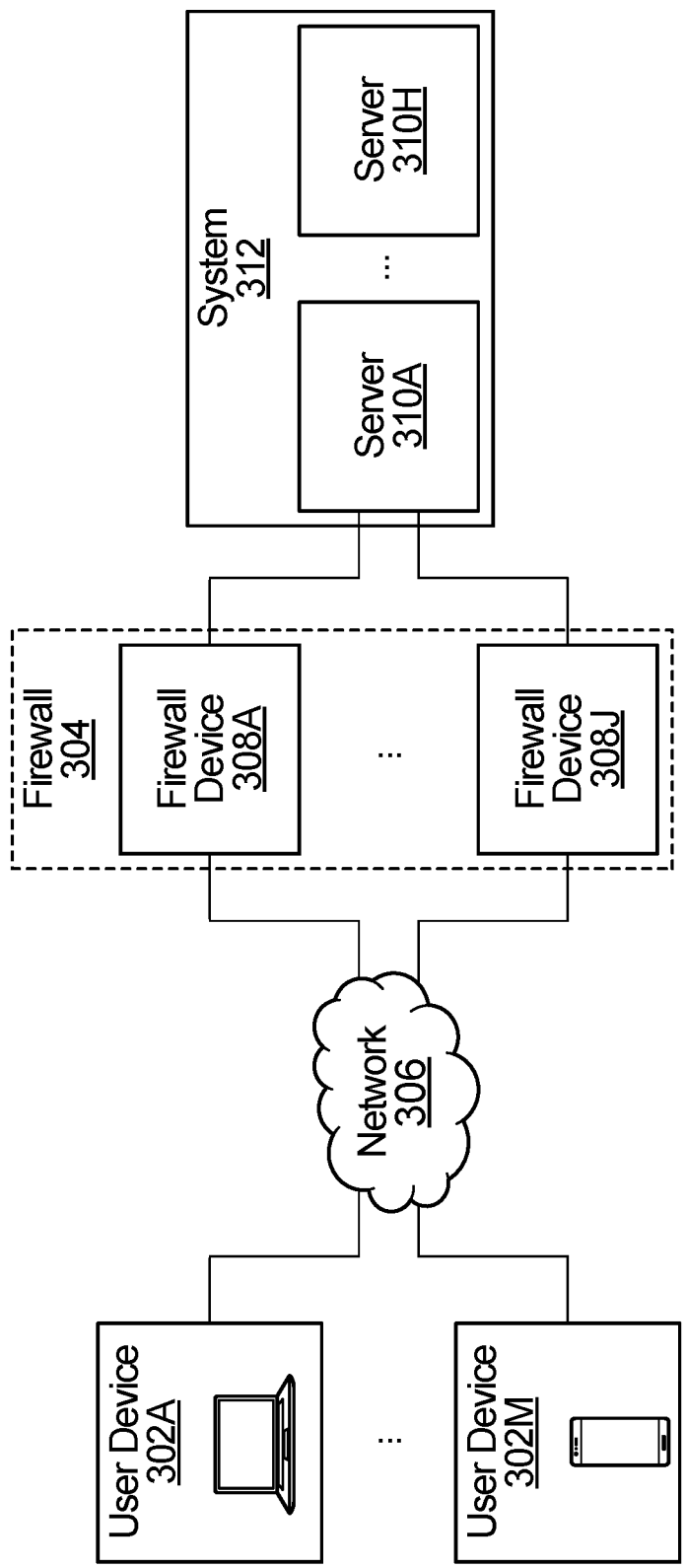
FIG. 1 illustrates a plurality of user devices communicating with a system for dynamically controlling traffic, according to one embodiment.

FIG. 1 is a block diagram illustrating a plurality of user devices 302A to 302M communicating with a system 312 over a network 306 via a firewall 304, according to one embodiment. In the following, the reference character 302 will be used when referring to any one of the user devices 302A to 302M, or any other user device. A user device 302 may be, for example, a mobile phone, or a tablet, or a laptop, or a personal computer, etc. A user device 302 may be a single device or a distributed set of devices, e.g. connected together using network communication. A user device 302 is associated with a user and can be uniquely identified. For example, a user device 302 may be identified via its IP address, a user ID, and/or browser ID, any of which may be carried in traffic sent from the user device 302. A browser ID may be an ID associated with the browser of the user device 302. The browser ID may be present in an HTTP cookie. The browser ID may be a general browser fingerprint, such as a user-agent string, or a token, etc. A user ID may be a unique set of characters (e.g. alphanumeric characters) assigned to the user device 302, e.g. on a first interaction with the system 312 so that the user device 302 can be identified across multiple interactions with the system 312. A user ID may be present in an HTTP cookie. Note that the user ID may be any ID used to uniquely identify the user device 302 (and/or the user of the user device 302), and therefore the user ID could correspond to, be, or include the IP address and/or the browser ID and/or some other ID.

The network 306 may be a computer network implementing wired and/or wireless connections between different devices, including the user devices 302A-302M, the firewall 304 and the system 312. The network 306 may implement any communication protocol known in the art. Non-limiting examples of network 306 include a local area network (LAN), a wireless LAN, an IP network, and/or a cellular network.

Firewall 304 is interposed between user devices 302A to 302M and system 312. In some embodiments, the firewall 304 is or implements a Web Application Firewall (WAF). Firewall 304 may include one or more firewall devices 308A to 308J. In the following, the reference character 308 will be used when referring to any one of the firewall devices 308A to 308J, or any other firewall device in firewall 304. Each firewall device 308 may be located on a respective server, e.g. on an edge node. In some embodiments, the firewall devices 308A to 308J may be distributed, e.g. each one located on a respective different server, such as a respective different edge node. In this way, the firewall 304 may be distributed and able to intercept traffic coming through any of the edge nodes, thereby intercepting all incoming traffic to system 312. The firewall devices 308A to 308J may each be communicably linked with the system 312. The link between firewall devices 308A to 308J and system 312 may be over a network connection, such as (for example) a local area connection and/or private network. In some embodiments, one or more of the firewall device 308A to 308J may be resource-constrained, e.g. in terms of available computer resources. In some embodiments, one or more of the firewall devices 308A to 308J may be remote from each other and/or remote from the system 312. In some embodiments, one of the firewall devices 308a to 308J may be a master device that communicates with the system 312 and controls the other firewall devices in firewall 304. In some embodiments, firewall 304 may include only one firewall device 308. In some embodiments, each firewall device 308A to 308J might actually be its own firewall independent from the other firewall devices, e.g. instead of there being a single firewall 304 consisting of multiple distributed firewall devices 308A to 308J, there may instead be multiple distributed firewalls.

The system 312 is a computer system located "behind" the firewall 304, i.e. protected by the firewall 304. The system 312 receives incoming traffic (e.g. requests) that originate from the user devices 302A to 302M, the incoming traffic having passed through the firewall 304. The system 312 may include one or more computer devices, e.g. one or more servers. Although the system 312 may just consist of one computing device (e.g. one server), for the sake of generality the system 312 is illustrated as including a plurality of computing devices, each referred to as a server. Specifically, servers 310A to 310H are illustrated, at least one of which is a destination server for receiving incoming traffic (e.g. for receiving requests from the user devices). The destination server may be the server that hosts the resource(s) requested in incoming traffic, e.g. the destination server may host a webpage requested in an incoming HTTP or HTTPS request. In the following, the reference character 310 will be used when referring to any one of the servers 310A to 310H or any other server in system 312. In some embodiments, a server 310 may actually be a plurality of distributed servers, e.g. the "destination server" in the system 312 may actually be multiple distributed servers. In some embodiments, the system 312 may be a distributed network of computing devices, e.g. a distributed network of servers 310A to 310H connected across a network, such as possibly connected across network 306. In some embodiments, communication between the servers 310A to 310H may occur via backhaul links and/or via an internal or private network. For example, the system 312 may be or include a private network, which is protected by firewall 304.

FIG. 2 is a block diagram of a user device 302, according to one embodiment. The user device 302 includes a user interface 404, a network interface 406, a processor 408, and a memory 410. The user interface 404 may be implemented as a display screen (which may be a touch screen), and/or a keyboard, and/or a mouse, etc. The network interface 406 of the user device 302 is for communicating over the network 306. The structure of the network interface will depend on how the user device 302 interfaces with the network 306. For example, if the user device 302 is a wireless device such as a mobile phone or tablet, the network interface 406 may comprise a transmitter/receiver with an antenna to send and receive wireless transmissions to/from the network 306. If the user device 302 is a computer connected to the network with a network cable, the network interface may comprise a network interface card (NIC), and/or a computer port (e.g. a physical outlet to which a plug or cable connects), and/or a network socket, etc. The processor 408 may be implemented as one or more processors configured to execute instructions stored in a memory (e.g. in memory 410) or in another non-transitory computer readable medium. The processor 408 directly performs or instructs the user device 302 to perform the operations of the user device 302, including those operations explained herein. Examples of operations may include processing user inputs received from the user interface 404, preparing traffic (e.g. requests) for transmission over the network 306 to the system 312, processing data (e.g. replies) received over the network 306 from the system 312, and/or instructing a display screen to display information. In some embodiments, some or all of the processor 408 may be implemented using dedicated circuitry, such as a programmed field-programmable gate array (FPGA), a graphical processing unit (GPU), or an application-specific integrated circuit (ASIC).

FIG. 3 is a block diagram of a firewall device 308 of firewall 304, according to one embodiment. The firewall device 308 includes a processor 502, a network interface 506, and a memory 504. The structure of the network interface 506 will depend on how the firewall device 308 interfaces with the network 306. For example, if the firewall device 308 is hosted on a server connected to the network with a network cable, the network interface may comprise a NIC, and/or a computer port (e.g. a physical outlet to which a plug or cable connects), and/or a network socket, etc. The processor 502 may be implemented as one or more processors configured to execute instructions stored in a memory (e.g. memory 504) or in another non-transitory computer readable medium. The processor 508 directly performs or instructs the firewall device 308 to perform the operations of the firewall device 308, including those operations explained herein. Examples of operations may include communicating with the system 312 to receive a command to implement a rule, and implementing the rule according to the command. In some embodiments, some or all of the processor 502 may be implemented using dedicated circuitry, such as a FPGA, a GPU, or an ASIC.

FIG. 4 is a block diagram of a server 310 of the system 312, according to one embodiment. Server 310 includes a processor 602, a memory 604, and a network interface 606. The structure of the network interface 606 will depend on how the server 310 interfaces with the network. For example, if the server 310 is hosted in a data center, and the server is connected to the network using a network cable, then the network interface may comprise a NIC, and/or a computer port (e.g. a physical outlet to which a plug or cable connects), and/or a network socket, etc. The processor 602 is implemented as one or more processors configured to execute instructions stored in a memory (e.g. memory 604) or in another non-transitory computer readable medium. The processor 602 directly performs or instructs the server 310 to perform the functions of the server 310 or system 312, e.g. receiving and responding to incoming traffic, detecting patterns of user activity based on the incoming traffic, obtaining a rule corresponding to a pattern of user activity, and/or transmitting a command to the firewall 304 to implement the rule. In some embodiments, some or all of the processor 602 may be implemented using dedicated circuitry, such as a FPGA, a GPU, or an ASIC. In some embodiments, the components of FIG. 4 may be distributed, e.g. across a plurality of distributed servers. For example, in some embodiments, the memory 604 does not reside on the same physical host as other components of the server 310 but may be found within the system 312.

Example methods of dynamic traffic control are presented below.

Figure 5:
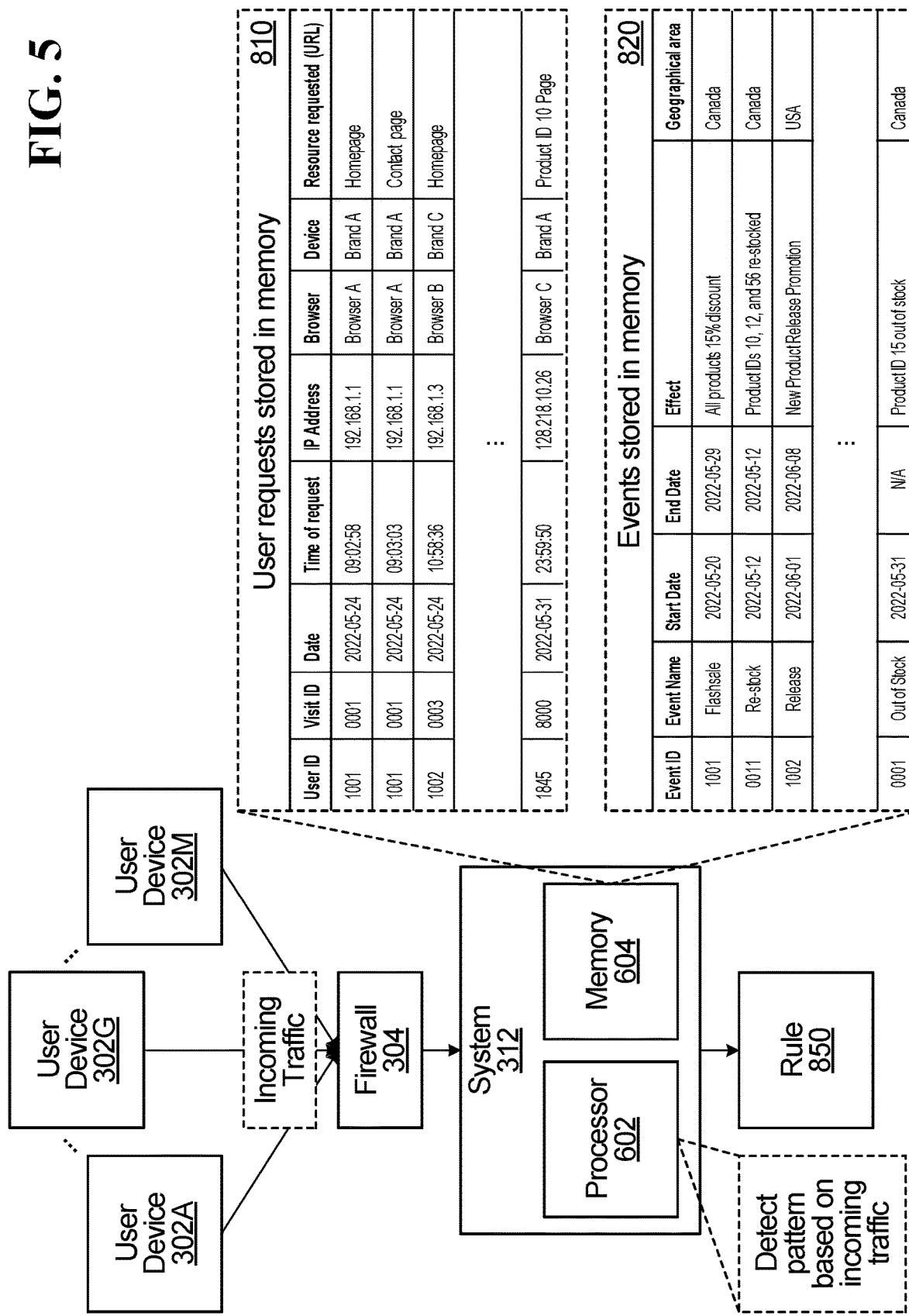
FIG. 5 is a flow diagram illustrating a method for obtaining a rule for a firewall, according to one embodiment.

FIG. 5 is a flow diagram first illustrating a method for dynamically obtaining a rule 850 for traffic control, according to one embodiment. The rule 850 is dynamically determined by the system 312 in response to detecting a pattern of user activity in incoming traffic.

User devices 302A to 302M send incoming traffic destined for system 312. The traffic may comprise one or more requests for one or more resources (e.g. web pages or functions). The one or more resources may be provided by system 312. For example, the incoming traffic may include a request (e.g. HTTP or HTTPS request) for a web page hosted by a destination server 310 in system 312. The firewall 304 intercepts the incoming traffic and determines how to process each item of incoming traffic (e.g. block it, allow it, delay it, etc.). If the incoming traffic is allowed by the firewall 304, the incoming traffic is transmitted (forwarded) from the firewall 304 to the system 312. The firewall 304 is illustrated as a single box, however, it may actually be a plurality of firewall devices 308 each receiving some of the incoming traffic. Each item of incoming traffic (e.g. each request) may contain various information about the user (e.g. user device 302) associated with that item of incoming traffic. User information may be stored in memory 604 of a server 310 of the system 312 and tracked by a processor 602 of the server 310. The processor 602 may track, store, and categorize user information based on past actions or interactions. Each time a user device 302 accesses a resource such as a web page (e.g. "product page X") or a function (e.g. "add to online cart") within the system 312, processor 602 may record a new entry with information about the device used to access the resource.

Example user requests stored in memory 604 are illustrated in stippled bubble 810. The user requests have been populated with example information for illustrative purposes. The information contained in user requests stored in memory 604 may include information indicating a user ID, and/or a visit ID, and/or a timestamp (such as a date and/or time) of a user request, and/or an IP address, and/or a browser ID, and/or a device type, and/or the specific requested resource (e.g. a URL requested in the user request). The user ID may be assigned by the processor 604 upon receiving the request and identifying the IP address of the request. For example, in the user requests illustrated in stippled bubble 810, IP address "192.168.1.1" is assigned user ID "1001". The visit ID may be assigned by the processor 604 once the user request accesses the requested resource. The visit ID may then be added to each subsequent user request during the same interaction with the system 312. For example, in the user requests illustrated in stippled bubble 810, user 1001 is assigned visit ID 0001 during its first interaction with the system 312 where it requests the website's homepage. If the user 1001 subsequently requests access to a resource different from the first, for example the website's contact page, the processor 604 may assign user visit ID 0001 to the request as communication with the system 312 has not been interrupted. The processor 604 may also store the timestamp (e.g. date and/or time) of each request. Browser information may also be stored. For example, the web browser used by the user may be identified and assigned a browser ID. The resource requested by the user request may also be stored, e.g. by storing the URL requested in the user request. Some of the collected information may be stored as a cookie on the user device 302. Note that the information illustrated in stippled bubble 810 is just an example. Different or additional information may be stored in actual implementation. For example, in one implementation just an identifier of the device (e.g. the device's IP address), a timestamp, and a requested resource (e.g. URL) may be tracked and stored for each user request.

In some embodiments, the system 312 may issue one or more cookies that may help track users. In some embodiments, users may create unique identifiers that can be tracked by the system 312. In some embodiments, a checkout may be assigned a unique ID (e.g. upon initiation of a checkout process), and the system 312 may track information related to traffic associated to that specific checkout ID.

In some embodiments, the system 312 may also have one or more events stored in memory 604. The one or more events may be e-commerce events, e.g. associated with one or more merchants, online stores, and/or online marketplaces, for example. Some example events are illustrated in stippled bubble 820 for illustrative purposes. The illustrated events include a flash sale, a re-stock, a product release, and a product being out of stock. Other e-commerce related events may also or instead be stored, e.g. an indication of a limited offering of a product, and/or a request for a web page relating to a product, and/or a request for a server of the system 312 to perform a function relating to a product, etc. In some embodiments, some or all of the stored events might not relate to e-commerce. For each stored event, information related to the event may include (if applicable): the start and/or end date of the event, and/or the geographical area to which the event pertains, and/or the effect of the event, etc. Each event may be uniquely identified by an event ID.

Once information about the incoming traffic has been stored, the system 312 may use the stored information to determine a pattern of user activity based on the incoming traffic, and then obtain a rule 850 corresponding to a pattern of user activity. In some embodiments, the pattern of user activity may be undesirable user activity. One example of undesirable user activity may be repeated requests for a same resource from a same user within a small window of time. In some embodiments, a pattern may be detected by counting how many requests of a same type are received over a particular window of time from a same user and determining that there is a pattern if the count exceeds a threshold. For example, the processor 602 may access the user requests stored in memory 604 (such as those shown in stippled bubble 810) and determine a pattern of user activity in which the user associated with IP address 192.168.1.1 (i.e. user 1001) has requested to access the same URL (a homepage of a same website) ten times in the past five seconds. This repeated request may be dynamically determined to be a pattern of undesirable user activity that should be mitigated. The pattern of user activity is mitigated by having the firewall 304 implement rule 850 that addresses the undesirable user activity, e.g. by having the firewall 304 implement the following rule 850 for each incoming request that arrives at the firewall 304: "if the request is from IP address 192.168.1.1 (i.e. the request is from user 1001), and if the request is for that URL (i.e. for that homepage), then block the request".

In some embodiments, different user requests in incoming traffic may be weighted ("scored") differently, and every time there is a request from a user, the associated score is added to the tally and action is taken if the tally exceeds a threshold. For example, a request to add a product to cart for a product out of stock may be more heavily weighted than a request for a product page for that product. As an example, if a user requests a product page then the counter increases by one, but if the user requests an "add-to-cart" function for a product out of stock then the counter increases by three. When the counter exceeds a certain threshold, a pattern of suspicious activity is determined to have occurred for that user and a rule is sent to the firewall 304 to block some or all requests from that user. By applying a weighting, activities that are more undesirable (such as trying to add to cart a product out of stock) may cause a rule addressing the activity to be implemented faster than activities that appear to be less suspicious (such as requesting a product page).

In some embodiments, a pattern of user activity may be detected using machine learning (ML). For example, an ML model may be trained using sequences of user activity that have been determined to be undesirable, such as multiple attempts to request a same resource in a short period of time. Then, post-training, the ML model may receive a stream of actual user requests in real-time or near-real time and identify if there is a pattern of user activity that is undesirable. The ML model might also be trained to output an indication of the rule to be implemented in response to the detected pattern of user activity, e.g. the ML model may issue a recommendation such as block the request or delay the request, etc.

In some embodiments, a pattern may be determined having regard to or based on the presence of an event. An indication of the event may be stored in memory. For example, event ID 1002 in stippled bubble 820 is a new product release that the system 312 is aware of for a particular product from a particular merchant. The product is to be released on Jun. 1, 2022 at 12:01 am, and there is an associated promotion of that product ongoing until midnight on Jun. 8, 2022. The processor 604 may determine a pattern of user activity in which multiple user requests for that product from a same user occur too often in a window just prior to and/or just subsequent to release of the product. In response, a rule is dynamically determined to block that user during that timeframe.

In some embodiments, a rule may be defined as a unit of decision making logic, where a single rule can comprise multiple criteria. For example, a rule may generally follow an "if [pattern user activity is detected] then [outcome]" structure. Examples of rules corresponding to a pattern of user activity, and which may be implemented in response to a detected pattern of user activity may include:
  If within Y seconds there are more than X requests received from a user to add to cart a product not in stock, then block that user from continuing to try to add the product to cart;
  If within Y seconds there are more than X requests for a particular web page (e.g. product page), then block that user from requesting that particular web page;
  If within Y seconds there are more than X requests for a particular function (e.g. add-to-cart or checkout), then block that user from requesting that particular function;
  If within Y minutes there are more than X payment card rejections, then block that user from paying using that payment card;
  If within Y minutes there are more than X online shops created, then block that user from creating further online shops;
  If within Y seconds there are more than X login fails, then block the user from continuing further login attempts;
  etc.
The above are just examples. Also, depending upon the implementation there might or might not be imposed a requirement that the requests need to originate from a same user. For example, if too many requests are received for a same resource (even if the requests originate from different users), then a rule may be implemented to intentionally delay a certain percentage of future requests for that resource. Also, the rule does not always have to block future requests. Depending on the scenario, example rules could include imposing a delay before allowing the future request or routing or rerouting the request.

Also, the patterns detected and rules implemented do not always need to be in relation to undesirable user activity. For example, a pattern may be detected that a particular user is performing desirable actions (e.g. buying certain types and/or quantities of items), and in response an implemented rule could route future requests from that user to a server in system 312 that will process those requests faster and/or more reliably. In other embodiments, the implemented rule could route requests from users who are not the particular user to, e.g., a server in system 312 that will process those users' requests at a slower rate and/or less reliably.

In some embodiments, patterns detected may relate to a characteristic of one or more users and/or user activity. For example, a detected pattern may be based on receiving a threshold number of requests for a resource (such as an interaction with the online store) from one or more users having one or more certain characteristics. The characteristics may relate to the identity of the user, and/or the location of the user, and/or the previous tracked behaviour or browsing history of the user, etc. In one example, the characteristics of a user may be the IP address and a payment card number the user submits in an online form. In this example, within a specified time period, both a large number of different payment card numbers received from the same IP address and a single payment card number received from multiple IP addresses may be a pattern detected.

Figure 6:
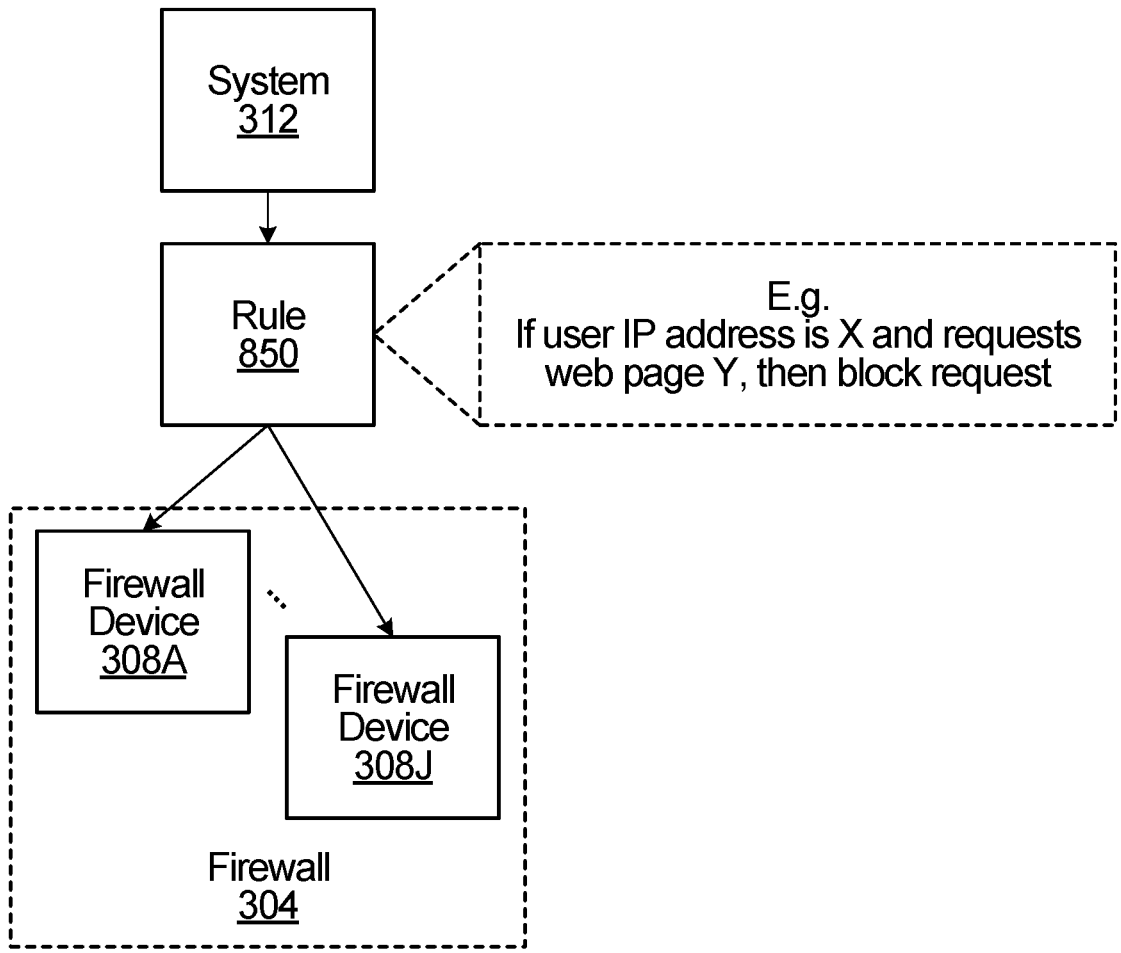
FIG. 6 is a flow diagram illustrating a method for transmitting the rule to the firewall, according to one embodiment.

FIG. 5 illustrates a rule 850 determined by the system 312 in response to detecting a pattern of user activity. The rule 850 is dynamically determined by the system 312, but the rule is implemented at the firewall 304. As shown in FIG. 6, the system 312 may transmit an indication of the rule 850 to the firewall 304. More specifically, a command may be transmitted to the firewall 304 to implement the rule 850. The command includes an indication of the rule 850 to implement. In some embodiments, the command may be sent to a particular "master" firewall device 308A of the firewall 304 to then be forwarded by the firewall device 308A to the other firewall devices 308B to 308J. In other embodiments, the system 312 may directly transmit the command to all the firewall devices 308A to 308J of firewall 304. In some embodiments, the system 312 may transmit the command to only a subset of the firewall devices 308. The subset of firewall devices 308 may correspond to the firewall devices 308 through which the user traffic is passing that corresponds to the detected pattern of user activity. In some embodiments, an intermediary between the firewall 304 and the system 312 may be used to receive the command from the system 312 and configure the firewall 304 to implement the rule 850.

In response to the command to implement the rule 850, the firewall 304 implements the rule 850 in relation to incoming traffic, e.g. by independently implementing the rule 850 at each of the firewall devices 308A to 308J. There may be different latencies associated with communicating and establishing the rule at each firewall device 308, e.g. depending upon how the rule is transmitted (e.g. unicast v. multicast transmission of the rule 850 to each firewall device 308A to 308J). In the example in FIG. 6, the rule 850 being transmitted to the firewall 304 is: "If user IP address is X, and if web page Y is being requested, then block request". In the payment card example above, the rule may involve blocking requests from the IP address that sent over a threshold number of different payment card numbers within a specified time window. It may also block IP addresses in response to a user or users submitting a payment card number that has been used more than a threshold number of times by different IP addresses within a specified time window. These are only a few examples. Other rules may be implemented additionally or instead.

In the embodiments described with reference to FIGS. 5 and 6, the firewall 304 does not have to track user activity over multiple user requests or dynamically determine the rule 850. Instead, the system 312 performs the monitoring and rule determination, and the firewall 304 just executes the rule 850. For an incoming item of traffic to the firewall (e.g. for an incoming user request), the rule 850 may be evaluated based on the information in the incoming item of traffic. The firewall 304 may remain stateless because the system 312 performs the tracking over time to determine the pattern and rule 850. In some embodiments, the command to implement the rule 850 at the firewall 304 may automatically expire after a particular period of time so that the system 312 does not have to explicitly instruct the firewall 304 to stop implementing the rule 850.

Figure 7:
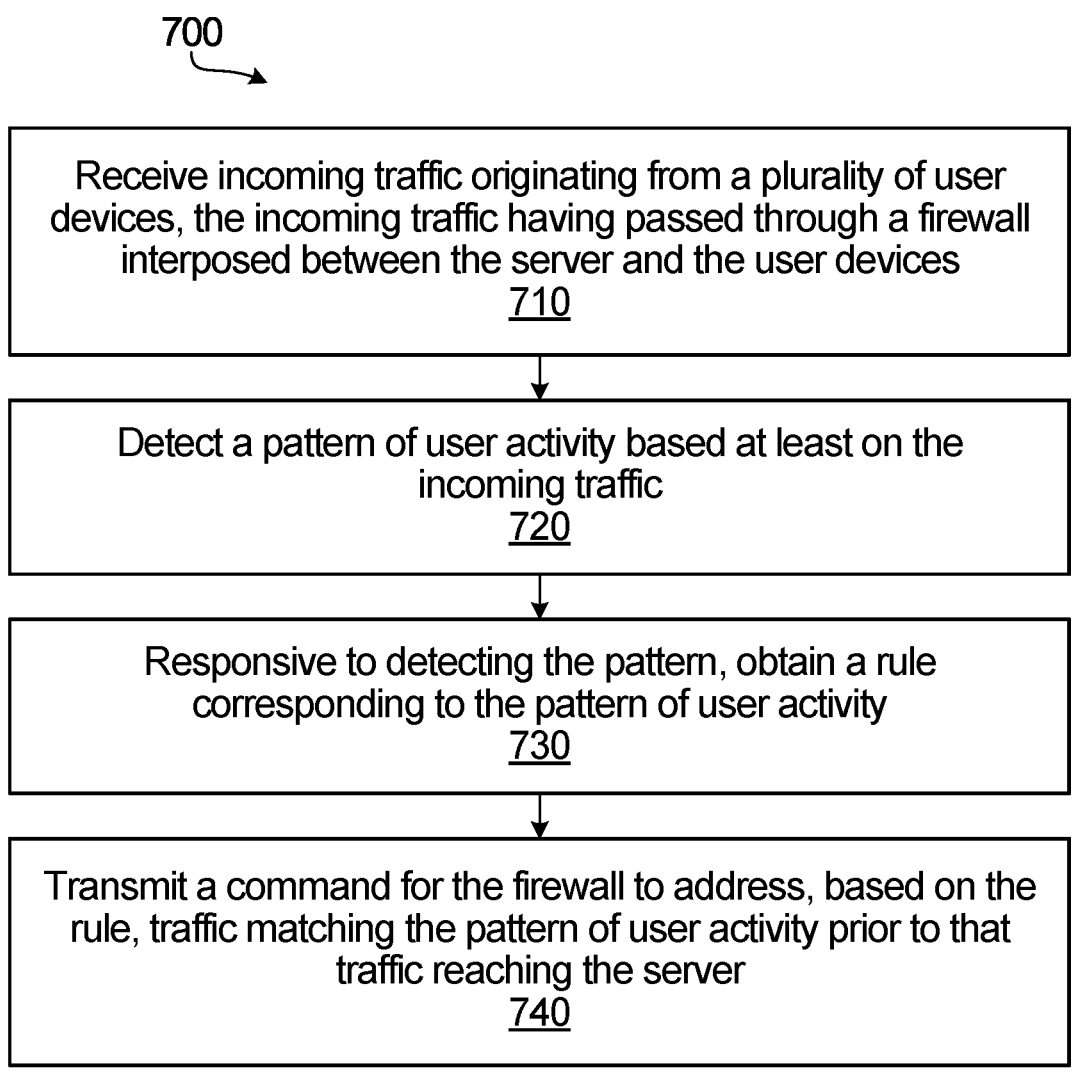
FIG. 7 is a computer-implemented method, according to one embodiment.

FIG. 7 illustrates a computer-implemented method 700 of dynamically controlling traffic, according to one embodiment.

At step 710, a server 310 of system 312 receives incoming traffic originating from a plurality of user devices 302A to 302M. The incoming traffic passed through firewall 304 interposed between the server 310 and the user devices 302A to 302M. In some embodiments, the incoming traffic may include one or more HTTP or HTTPS requests. The HTTP or HTTPS requests may be received through a network port of network interface 606 over a TCP/IP connection.

At step 720, the system 312 detects a pattern of user activity based at least on the incoming traffic. The detection may be performed by the same server that received the incoming traffic (the "destination server"), or the detection may be performed by another computing device (e.g. another server) in the system 312. The detection is dynamic, i.e. in response to monitoring incoming traffic (e.g. incoming requests) and identifying patterns of user activity. As discussed earlier, different ways for identifying patterns may be implemented. For example, a counter may be incremented each time a same resource is requested by a same user device, and if the counter exceeds a threshold within a certain window of time (e.g. 10 requests in 5 seconds), then a pattern of user activity is detected, the pattern in this example being too many requests for that same resource from that same user. In another example, information from incoming requests is input into a trained ML, model, and the ML model detects patterns.

In some embodiments, the system 312 may query a memory (e.g. the memory 604) to access information about the incoming traffic to identify a pattern of user activity. In some embodiments, the pattern of user activity is detected across incoming traffic received from the plurality of the firewall devices 306A to 306J, which may allow for patterns to be detected relating to incoming traffic distributed across multiple firewall devices, e.g. patterns that a single firewall device 306 would not be able to detect.

At step 730, responsive to detecting the pattern, the system 312 obtains a rule corresponding to the pattern of user activity. The rule determined will vary depending on the pattern of user activity detected. The rule may be a unit of decision making logic for the firewall 304 to implement, where a single rule may include multiple criteria. A rule may generally follow an "if [pattern user activity is detected] then [outcome]" structure. In some embodiments, the rule is determined by: (1) identifying the pattern of user activity; (2) obtaining a user ID (e.g. IP address) of the user performing the user activity, e.g. from the at least some of the incoming traffic corresponding to the user activity; (3) extracting the identification of the resource (e.g. URL of webpage or function) associated with the user activity, e.g. from at least some of the incoming traffic corresponding to the user activity; and (4) generating a command instructing the firewall to deny any request from that identified user (e.g. from that IP address) for the identified resource. Generating the command may include inserting the command instruction into a payload of a data packet that is for transmission from the system 312 to the firewall 304.

At step 740, the command is transmitted from the system 312 to the firewall 304. Transmitting the command may involve transmitting the command to each of the firewall devices 308A to 308J of the firewall 304. The command instructs the firewall 304 to address, based on the rule, traffic matching the pattern of user activity prior to that traffic reaching the server. Traffic "matching" the pattern of user activity may be determined by evaluating incoming traffic (such as user requests) arriving at the firewall 304 and determining whether that traffic satisfies/meets the "if" portion of the if-then condition of the rule. For example, if the rule is "if user X requests webpage Y, then block request", then the traffic matching the pattern of user activity is any traffic originating from user X that requests webpage Y. The matching traffic may be "addressed" by the firewall 304 by implementing the "then" portion of the if-then condition. For example, if the rule is "if user X requests webpage Y, then block request", then the matching traffic is addressed by the firewall 304 blocking the request. In operation, a processor of the firewall 304 (e.g. processor 502) may first extract information from incoming traffic to identify particular information (e.g. the user's IP address, the URL of the resource, etc.). The processor may then use the particular information to determine if the "if" condition for the rule is met. If the condition is met, the processor processes the request according to the "then" portion of the rule.

In some embodiments, the command sent to the firewall 304 to implement the rule automatically expires after a particular amount of time. The particular amount of time will be referred to as the expiry time. Once the expiry time is reached, the rule expires, i.e. the firewall 304 no longer implements the rule in relation to incoming traffic. The expiry time may be determined/set in advance, e.g. the firewall 304 may be programmed to have a default expiry time. Additionally or alternatively, the expiry time may be indicated in the command. For example, the system 312 may command the firewall 304 to implement the rule 850 until the end of the day. In some embodiments, the expiry time may be based on an e-commerce event. For example, with reference to FIG. 5, if event 1002 is to run between Jun. 1, 2022, and Jun. 8, 2022, the system 312 may command the firewall 304 to implement the rule only during the event period, e.g. the system 312 may set the expiry time as 11:59 pm on Jun. 8, 2022. A non-exhaustive list of example e-commerce events includes: a flash sale; and/or a limited offering of a product; and/or a product that is out of stock; and/or a product that is recently re-stocked; and/or a release of a product; and/or a request for a web page relating to a product; and/or a request for the system 312 to perform a function relating to a product. For example, a product may be out of stock and a rule preventing a user from adding such a product to cart may be implemented for a period of time until the expected date the product will return in stock.

The advantage of having the command automatically expire is that it reduces network overhead. The firewall 304 does not have to track the rules being implemented by the firewall 304, determine whether the rule needs to be implemented any more, or explicitly instruct the firewall 304 to stop implementing the rule. Instead, the command to implement the rule automatically expires, e.g. after a set amount of time that may be default or instructed by the system 312, e.g. in the command itself.

In some embodiments of the method of FIG. 7, the pattern of user activity that is detected may be undesirable user activity. One example of a possible undesirable user activity is the number of requests for a same resource exceeding a threshold within a particular window of time, e.g. more than X requests for a same resource within Y seconds. The resource requested may be a web page or a function. For example: (1) Within Y seconds there are more than X requests received to add to cart a product not in stock; and/or (2) Within Y seconds there are more than X requests for a particular web page (e.g. product page); and/or (3) Within Y seconds there are more than X requests for a particular function (e.g. add-to-cart or checkout); and/or (4) Within Y minutes there are more than X payment card rejections; and/or (5) Within Y minutes there are more than X online shops created; and/or (6) within Y seconds there are more than X login fails; and/or (7) The user is requesting to add all (or too many) products in stock to their cart; etc. Depending upon the implementation, there might or might not be imposed a requirement that the X requests need to originate from same user. For example, a pattern may be detected if there are too many requests for a particular resource independent of whether those requests all come from a same user device (e.g. from a same IP address). The rule may therefore be user independent in some embodiments, e.g. if too many requests are received for a same resource (even if the requests originate from different users), then intentionally delay a certain percentage of future requests for that resource.

In some embodiments, the rule may mitigate the undesirable user activity. For example, if the undesirable user activity is repeated requests for a same resource (possibly all from a same user), then the rule may block or delay such requests. Continuing the examples above, the rule implemented might include one or more of: (1) Block or delay a request to add to cart a product not in stock (e.g. the system 312 may command the firewall 304 to implement such a rule if the system 312 dynamically determines that within Y seconds there are more than X requests received to add to cart that product not in stock); and/or (2) Block or delay a request for a particular web page (e.g. the system 312 may command the firewall 304 to implement such a rule if the system 312 dynamically determines that within Y seconds there are more than X requests for the particular web page); and/or (3) Block or delay a request for the system to perform a particular function (e.g. the system 312 may command the firewall 304 to implement such a rule if the system 312 dynamically determines that within Y seconds there are more than X requests for the particular function); and/or (4) Block or delay a request for payment from a particular user (e.g. the system 312 may command the firewall 304 to implement such a rule if the system 312 dynamically determines that within Y minutes there are more than X payment card rejections); and/or (5) Block or delay a request from a particular user to create an online shop (e.g. the system 312 may command the firewall 304 to implement such a rule if the system 312 dynamically determines that within Y minutes there are more than X online shops created by that user); and/or (6) Block or delay a login attempt from a particular user (e.g. the system 312 may command the firewall 304 to implement such a rule if the system 312 dynamically determines that within Y seconds there are more than X login fails); and/or (7) Block or delay a user from accessing a resource, such as add-to-cart function (e.g. the system 312 may command the firewall 304 to implement such a rule if the system 312 dynamically determines that a user is requesting to add all or too many products in stock to their cart); etc. Depending on the scenario, the rule may be implemented in relation to only a particular user, or it may be implemented in relation to a subset or all users. For example, if the system 312 dynamically determines that there are too many requests to add to cart a product not in stock, then the system 312 may command the firewall 304 to block all requests to add to cart that product not in stock, regardless of the user making the request. In other situations, the rule may be user-specific, e.g. if the incoming request for a resource X is from user Y, then block or delay that request.

In some embodiments of FIG. 7, the system 312 detects a pattern of user activity from a same user, and in response to detecting the pattern obtains a rule to address the pattern of user activity. In some such embodiments, the same user may be identified from at least one of: an IP address that is the same across the repeated requests; a browser ID that is the same across the repeated requests; a user ID that is the same across the repeated requests; or another ID that is the same across the repeated requests, e.g. a unique "object" ID, such as a checkout ID (associated with a checkout process) or a cart ID (associated with an online cart). In some embodiments, the user ID may encompass any one or some of these foregoing IDs (e.g. the user ID may be the IP address and/or the browser ID and/or the object ID). In some embodiments, the same user may be identified from a combination of IDs or portions thereof.

In some embodiments of FIG. 7, the user activity may be associated with an e-commerce event. A non-exhaustive list of example e-commerce events includes: a flash sale; and/or a limited offering of a product; and/or a product that is out of stock; and/or a product that is recently re-stocked; and/or a release of a product; and/or a request for a web page relating to a product; and/or a request for the system 312 to perform a function relating to a product. For example, the user activity may be a particular user trying to purchase a product subject to a flash sale too often. As another example, the user activity may be a particular user trying to add a product to a cart that is out of stock; etc.

In some embodiments of FIG. 7, the rule, when implemented, may cause blocking at least some of the traffic matching the pattern prior to that traffic reaching the system 312. For example, the rule may deny/block any request satisfying the "if" condition of the "if-then" rule, where the "if" condition corresponds to the pattern (e.g. the rule may be "If user X is requesting resource Y, then block request", in which case the corresponding pattern of user activity is user X requesting resource Y).

In some embodiments of FIG. 7, the rule, when implemented, may cause the firewall 304 to impose a delay before allowing the traffic matching the pattern to proceed to the system 312. For example, the purpose of the rule may be to intentionally slow down or buffer requests for a particular resource from a particular user. If the request from the user satisfies the "if" condition of the "if-then" rule, then it matches the pattern of user activity to be addressed and the request is held by the firewall for X seconds before the request is forwarded from the firewall 304 to the system 312. In some embodiments, the firewall 304 may implement the delay via a store and forward operation, i.e. the firewall 304 does not forward the traffic immediately to the system 312, but instead the firewall 304 first stores the traffic for a particular amount of time (corresponding to the intentional delay), and then forwards the traffic to the system 312. In some embodiments, the imposed delay might actually be implemented by blocking the traffic, e.g. on the assumption or knowledge that the user device will resend the traffic (e.g. resend the request). The blocking of the initial try (or tries) may thereby impose a delay on the request reaching the system 312 because it takes several tries for the request to reach the system 312.

In some embodiments of FIG. 7, the rule, when implemented, may cause routing or rerouting the traffic matching the pattern to a particular destination, where the particular destination may be a different destination from where the traffic would normally be sent. For example, the purpose of the rule may be to send certain traffic to a higher priority/faster destination server in the system 312. If the request from the user satisfies the "if" condition of the "if-then" rule, then it matches the pattern of user activity to be addressed and the request is sent to the higher priority/faster destination server 312. Examples in which traffic may be routed or rerouted to a different destination may include: routing a request to a server that responds to the request more promptly, e.g. because the request is associated with a user that is to be prioritized (e.g. because that user is known to the system 312); routing a request to a server that responds to the request more slowly, e.g. because the request is associated with a user that is low priority (e.g. because the system 312 has determined that the user is associated with a geographical location that is low priority); routing a request to a location on the network for further security analysis, e.g. because the request is associated with a user that the system 312 has identified as untrusted (e.g. because that user has performed unusual activity in the past). In these examples, the user matches the pattern of activity (e.g. by satisfying the "if" condition of the "if-then" rule), and so is processed according to the rule by routing the request to the particular destination.

In some embodiments of the method of FIG. 7, the firewall 304 may include a plurality of firewall devices 308A to 308J. The incoming traffic may be received from the plurality of the firewall devices 308A to 308J. For example, each firewall device may be on a respective different edge node to provide full protection for the system 312, e.g. such that incoming traffic arriving via any direction (e.g. arriving via any edge node) is intercepted by at least one firewall device of the firewall. In some such embodiments, the pattern of user activity may be detected by the system 312 across the incoming traffic received from the plurality of the firewall devices. This allows for patterns to be detect that are spread across multiple firewall devices. For example, if there are a large number of requests for a certain resource (e.g. web page or function), but the requests originate from different user devices and pass through different firewall devices, then there might not be a pattern detected at or in relation to any one firewall device. However, system 312 has a holistic view and will therefore still detect the pattern.

In some embodiments of FIG. 7, detecting the pattern of user activity in the incoming traffic may include counting how many requests for a same resource are received over a particular window of time, and identifying the pattern if the count exceeds a threshold. For example, if it is determined that more than X requests from a same user for a same resource occur within a window of Y seconds, then a pattern of too many requests from the user for the resource may be detected. In this example, the threshold is X and the window of time is Y seconds. The number of request may be a running average, e.g. the running average of requests may need to be more than X in the last Y seconds. As mentioned earlier, in some embodiments different user requests in incoming traffic may be weighted ("scored") differently. In other embodiments, detecting the pattern is not necessarily performed by counting. Another approach may involve using ML to detect patterns, e.g. as discussed earlier. For example, an ML model may be trained using past examples of user activity and then, post-training, in real-time or near real-time as incoming traffic is received at the system 312 the information in the incoming traffic may be input into the trained ML model. The output of the ML model may be an indication (e.g. probability) of a particular user activity, possibly as well as an indication of a rule to be implemented. If a threshold is met (e.g. the probability of there being a particular pattern of user activity exceeds a threshold), then the rule may be implemented.

In some embodiments of the method of FIG. 7, there may be an intermediary between the server 310 and the firewall 304, e.g. to facilitate communication between the server 310 and the firewall devices 308A to 308J. For example, the intermediary may be responsible for receiving a rule from the system 312 and configuring (e.g. instructing) the firewall 304 to implement the rule, which may involve the intermediary forwarding the rule to each of the firewall devices 308A to 308J.

Technical benefits of some embodiments include the following.

The firewall 304 itself does not monitor for patterns of user activity, nor does it dynamically determine to implement rules in response to detected patterns. Instead, the system 312 performs the monitoring, detecting a pattern, and obtaining a rule. The system 312 transmits a command to the firewall 304 to implement the rule. Implementing the rule is much less complex than what is required to monitor, detect a pattern of user activity, and in response dynamically determine what the rule should be. The firewall 304 is just executing rules the system 312 instructs it to execute. Therefore, the firewall 304 may remain lower complexity, e.g. the firewall 304 may be able to remain stateless. A stateless firewall does not need to maintain a record of previous user requests, rather it is designed to handle a user request entirely on information in the user request. This may significantly reduce the complexity of the firewall. The system 312 relieves the firewall 304 of the complexity of tracking user activity over time, detecting particular patterns of user activity, and in response deciding what rule to dynamically implement. Also, the system 312 may have a more holistic view of the user activity, e.g. if repeated user requests for a web page happen to be distributed amongst different firewall devices 308A to 308J of the firewall 304, then the firewall 304 would not necessarily detect a trend of user activity. The system 312 is better able to detect trends distributed amongst different firewall devices.

However, the combination of the firewall 304 and system 312 also provides benefits to the system 312, not just the firewall 304. The firewall 304 relieves the system 312 of having to implement the firewall 304. The server(s) on the system 312 is/are typically configured to handle backend heavy business logic that consumes significant computer resources. Therefore, it is not desirable to take computer resources of the system to implement the firewall 304. The system 312 has the benefit of delegating the implementation of the rule (e.g. the blocking or delaying of incoming requests) to the firewall 304, which is less computationally expensive than implementing the rule at the system 312 because the firewall 304 is less complex, e.g. possibly stateless and/or operating at a lower level in the Open Systems Interconnection (OSI) model, etc. If the incoming traffic is large enough in volume, the efficiency of the system 312 would be reduced if it had the additional task of running the firewall 304. Moreover, implementing the firewall 304 at the destination server negates the security benefits of having a firewall 304 separate from the system 312, e.g. at the edge nodes. If there is no firewall 304 at the edge node to block undesirable traffic, then malicious requests (e.g. having virus code) will be received at the system 312 (e.g. directly at the destination server), and the system 312 (e.g. the destination server) may potentially be exposed to a denial of service attack if the quantity of requests becomes too large.

Therefore, the firewall 304 and system 312 working in combination and each taking on the respective different tasks, as described, may provide for dynamic implementation of rules in response to detected patterns of user activity, while doing so in a way that is beneficial in implementation for both the firewall 304 and the system 312.

Figure 8:
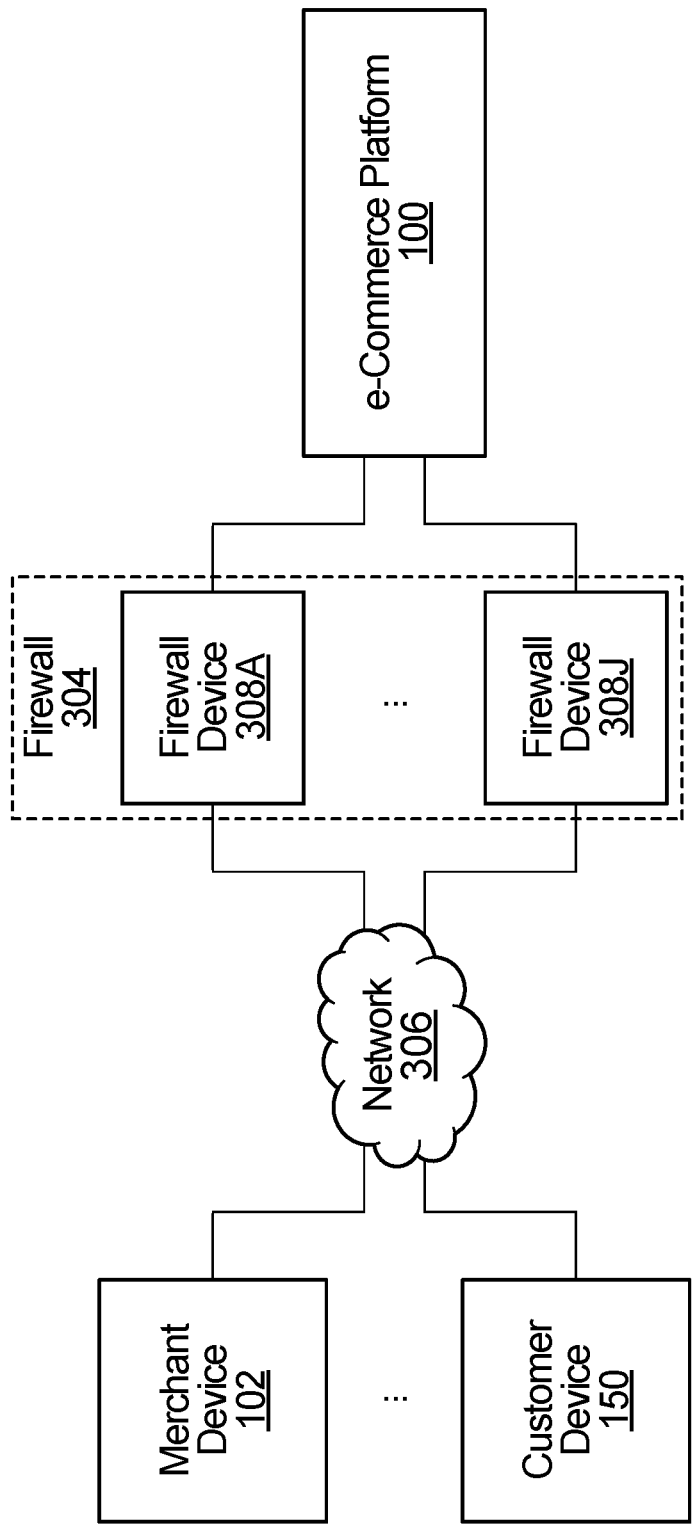
FIG. 8 is a system for dynamically controlling traffic sent to an e-commerce platform, according to one embodiment.

FIG. 8 illustrates an example in which system 312 of FIG. 1 is a commerce platform, referred to as e-commerce platform 100. The user devices may include customer device 150 and/or merchant device 102. The customer device 150 and/or merchant device 102 may generate requests to access the resources of the e-commerce platform 100. The requests may be described as incoming traffic and pass over the network 306 and through the firewall 304 prior to reaching the e-commerce platform 100. The e-commerce platform 100 may track and store the incoming traffic on a memory. The e-commerce platform 100 may determine a pattern of user activity in the incoming traffic and obtain a rule corresponding to the pattern of user activity. In some embodiments, the rule may be associated with an e-commerce event stored in memory of the e-commerce platform 100. The e-commerce platform 100 may transmit a command to the firewall 304 to address, based on the rule, traffic matching the pattern of user activity prior to that traffic reaching the e-commerce platform 100. One example of e-commerce platform 100 is described below for completeness.

Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 9:
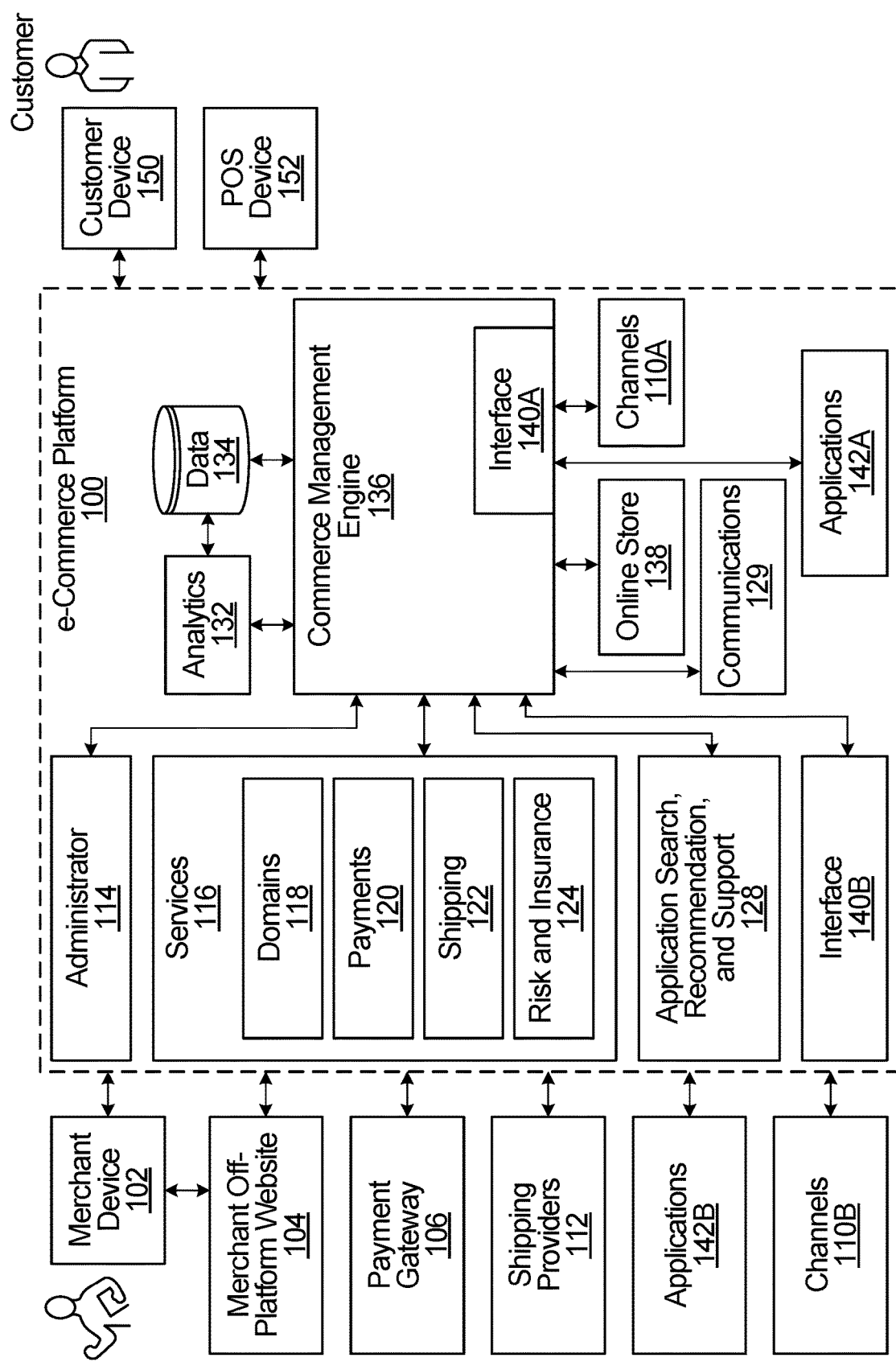
FIG. 9 is a block diagram of the e-commerce platform, according to one embodiment.

FIG. 9 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 9, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 10:
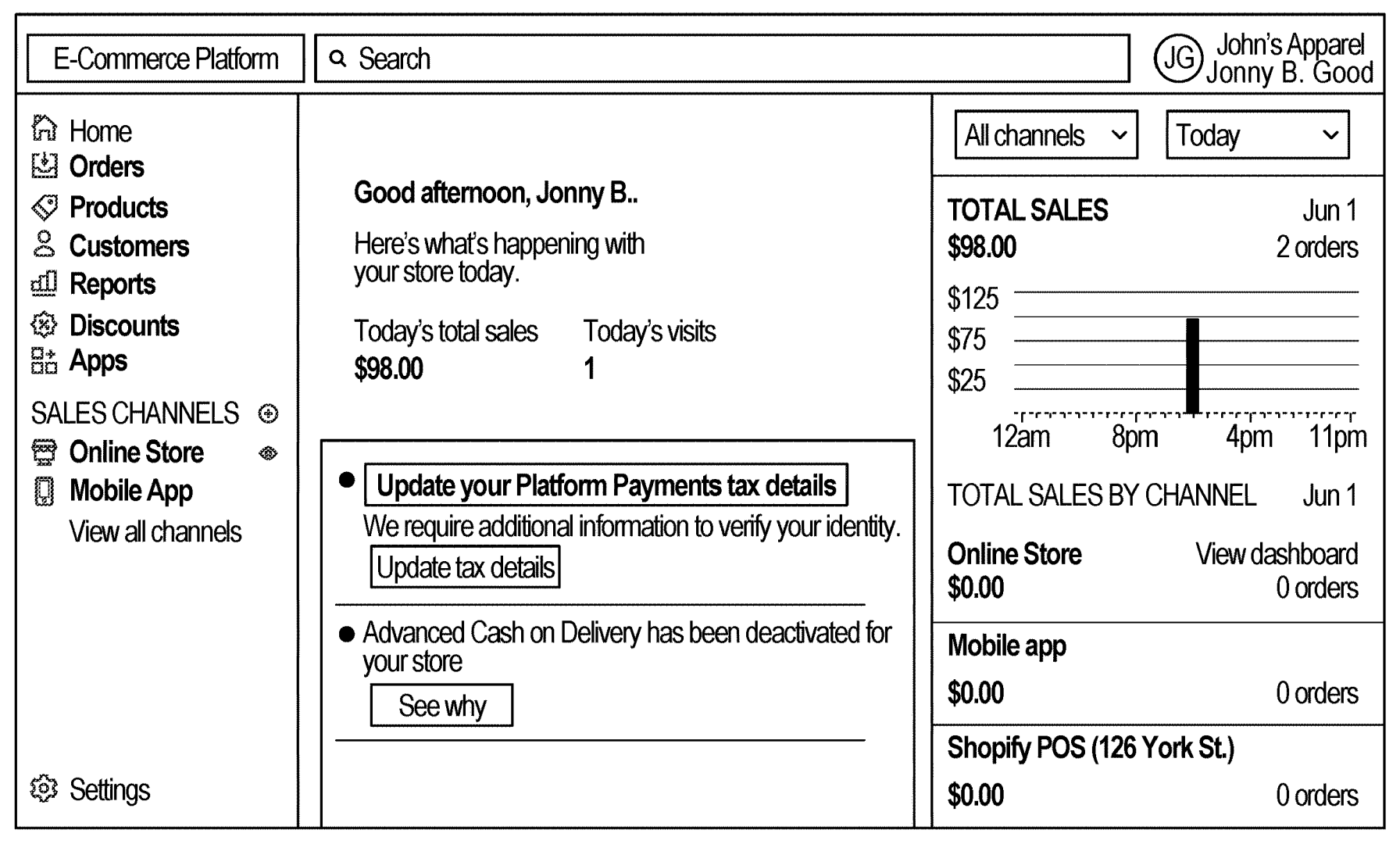

FIG. 10 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 10. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 9, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
   receiving, at a server, incoming traffic originating from a plurality of user devices, the incoming traffic having passed through a firewall interposed between the server and the user devices;
   detecting a pattern of user activity based at least on the incoming traffic;
   responsive to detecting the pattern: obtaining a rule corresponding to the pattern of user activity;
   transmitting a command for the firewall to address, based on the rule, traffic matching the pattern of user activity prior to the traffic matching the pattern reaching the server; and
   transmitting with the command an indication identifying when the command is to automatically expire, wherein the command is to automatically expire after a particular amount of time, and wherein the particular amount of time is based on an e-commerce event.

2. The computer-implemented method of claim 1, wherein the pattern of user activity is undesirable user activity, and the rule mitigates the undesirable user activity.

3. The computer-implemented method of claim 2, wherein the undesirable user activity comprises repeated requests for a same resource from a same user.

4. The computer-implemented method of claim 3, wherein the repeated requests for the same resource are for a same web page or for a same function to be performed by the server.

5. The computer-implemented method of claim 3, wherein the same user is identified from at least one of:
   an IP address that is the same across the repeated requests;
   a browser ID that is the same across the repeated requests; or
   a user ID that is the same across the repeated requests.

6. The computer-implemented method of claim 1, wherein the user activity is associated with the e-commerce event.

7. The computer-implemented method of claim 6, wherein the e-commerce event includes one of:
- a flash sale;
- a limited offering of a product;
- a product that is out of stock;
- a product that is recently re-stocked;
- a release of a product;
- a request for a web page relating to a product; or
- a request for the server to perform a function relating to a product.

8. The computer-implemented method of claim 1, wherein the rule, when implemented, causes one of:
- blocking at least some of the traffic matching the pattern prior to that traffic reaching the server;
- imposing a delay before allowing the traffic matching the pattern to proceed to the server; or
- routing or rerouting the traffic matching the pattern to a different destination.

9. The computer-implemented method of claim 1, wherein:
- the firewall includes a plurality of firewall devices;
- the incoming traffic being received is from the plurality of firewall devices; and
- the pattern of user activity is detected across the incoming traffic received from the plurality of the firewall devices.

10. A system comprising:
- at least one processor; and
- a memory storing processor-executable instructions that, when executed, cause the at least one processor to:
  - detect a pattern of user activity based at least on incoming traffic received at a server, the incoming traffic originating from a plurality of user devices, and the incoming traffic having passed through a firewall interposed between the server and the user devices;
  - responsive to detecting the pattern: obtain a rule corresponding to the pattern of user activity;
  - transmit a command for the firewall to address, based on the rule, traffic matching the pattern of user activity prior to the traffic matching the pattern reaching the server; and
  - transmit with the command an indication identifying when the command is to automatically expire, wherein the command is to automatically expire after a particular amount of time, and wherein the particular amount of time is based on an e-commerce event.

11. The system of claim 10, wherein the pattern of user activity is undesirable user activity, and the rule mitigates the undesirable user activity.

12. The system of claim 11, wherein:
- the undesirable user activity comprises repeated requests for a same resource from a same user; and
- the repeated requests for the same resource are for a same web page or for a same function to be performed by the server.

13. The system of claim 12, wherein the same user is identified from at least one of:
- an IP address that is the same across the repeated requests;
- a browser ID that is the same across the repeated requests; or
- a user ID that is the same across the repeated requests.

14. The system of claim 10, wherein the user activity is associated with the e-commerce event.

15. The system of claim 14, wherein the e-commerce event includes one of:
- a flash sale;
- a limited offering of a product;
- a product that is out of stock;
- a product that is recently re-stocked;
- a release of a product;
- a request for a web page relating to a product; or
- a request for the server to perform a function relating to a product.

16. The system of claim 10, wherein the rule, when implemented, causes one of:
- blocking at least some of the traffic matching the pattern prior to that traffic reaching the server;
- imposing a delay before allowing the traffic matching the pattern to proceed to the server; or
- routing or rerouting the traffic matching the pattern to a different destination.

17. A non-transitory computer-readable medium having stored thereon computer-executable instruction that, when executed by at least one processor, cause a computer to perform operations comprising:
- detecting a pattern of user activity based at least on incoming traffic received at a server, the incoming traffic originating from a plurality of user devices, and the incoming traffic having passed through a firewall interposed between the server and the user devices;
- responsive to detecting the pattern: obtaining a rule corresponding to the pattern of user activity;
- transmitting a command for the firewall to address, based on the rule, traffic matching the pattern of user activity prior to the traffic matching the pattern reaching the server; and
- transmitting with the command an indication identifying when the command is to automatically expire, wherein the command is to automatically expire after a particular amount of time, and wherein the particular amount of time is based on an e-commerce event.

* * * * *